United States Patent
Duenas et al.

(10) Patent No.: US 9,045,087 B2
(45) Date of Patent: Jun. 2, 2015

(54) CENTRE CONSOLE

(71) Applicant: Daimler AG, Stuttgart (DE)

(72) Inventors: Santiago Duenas, Ammerbuch (DE); Kai Goldbeck, Stuttgart (DE); Marko Niessner, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/355,889

(22) PCT Filed: Oct. 17, 2012

(86) PCT No.: PCT/EP2012/004333
§ 371 (c)(1),
(2) Date: May 2, 2014

(87) PCT Pub. No.: WO2013/064213
PCT Pub. Date: May 10, 2013

(65) Prior Publication Data
US 2014/0284957 A1    Sep. 25, 2014

(30) Foreign Application Priority Data

Nov. 5, 2011  (DE) .......................... 10 2011 117 737

(51) Int. Cl.
*B60R 7/04* (2006.01)
*B60N 2/46* (2006.01)
*B60N 3/10* (2006.01)

(52) U.S. Cl.
CPC ................ *B60R 7/04* (2013.01); *B60N 2/4686* (2013.01); *B60N 3/101* (2013.01)

(58) Field of Classification Search
CPC ........................................................ B60R 7/04
USPC .......................... 296/37.8, 24.34, 37.1, 37.15
IPC ...................................................... B60R 13/00
See application file for complete search history.

(56) References Cited

U.S. PATENT DOCUMENTS

| 4,848,627 | A | | 7/1989 | Maeda et al. |
| 5,085,481 | A | * | 2/1992 | Fluharty et al. ............... 296/37.8 |
| 6,045,173 | A | | 4/2000 | Tiesler et al. |
| 6,419,314 | B1 | * | 7/2002 | Scheerhorn ............. 297/188.19 |
| 6,726,267 | B2 | * | 4/2004 | Kim et al. .................. 296/24.34 |
| 6,921,118 | B2 | * | 7/2005 | Clark et al. ................. 296/24.34 |

(Continued)

FOREIGN PATENT DOCUMENTS

DE    195 42 198 A1    5/1997
DE    196 15 743 C1    9/1997

(Continued)

OTHER PUBLICATIONS

International Search Report (PCT/ISA/210) with English translation dated Dec. 6, 2012 (Seven (7) pages).

(Continued)

*Primary Examiner* — Pinel Romain
(74) *Attorney, Agent, or Firm* — Crowell & Moring LLP

(57) ABSTRACT

A center console of a motor vehicle has a cover that is able to be opened, which closes a storage compartment that lies thereunder in its closed position and releases this in an open position. A comfortable adjustment of the cover is possible via an adjustment mechanism. The adjustment mechanism is formed in such a way that it first lifts the cover during opening and adjusts it backwards and subsequently swings it upwards.

14 Claims, 1 Drawing Sheet

(56) References Cited

U.S. PATENT DOCUMENTS

| | | | |
|---|---|---|---|
| 7,234,746 B2* | 6/2007 | Sakakibara et al. | 296/24.34 |
| 7,766,408 B2* | 8/2010 | Lota et al. | 296/37.1 |
| 7,784,843 B2* | 8/2010 | Lota et al. | 296/24.34 |
| 7,954,663 B2* | 6/2011 | DePue | 220/813 |
| 2007/0018493 A1* | 1/2007 | Kawachi et al. | 297/411.37 |
| 2007/0205622 A1* | 9/2007 | Whitens et al. | 296/24.34 |
| 2010/0090491 A1* | 4/2010 | Hipshier et al. | 296/24.34 |
| 2010/0156132 A1* | 6/2010 | Gaudig et al. | 296/37.14 |

FOREIGN PATENT DOCUMENTS

| | | |
|---|---|---|
| DE | 10 2004 057 016 A1 | 6/2006 |
| EP | 1 055 552 A1 | 11/2000 |
| FR | 2 792 590 A1 | 10/2000 |

OTHER PUBLICATIONS

German language Written Opinion (PCT/ISA/237) dated Dec. 6, 2012 (Six (6) pages).

* cited by examiner

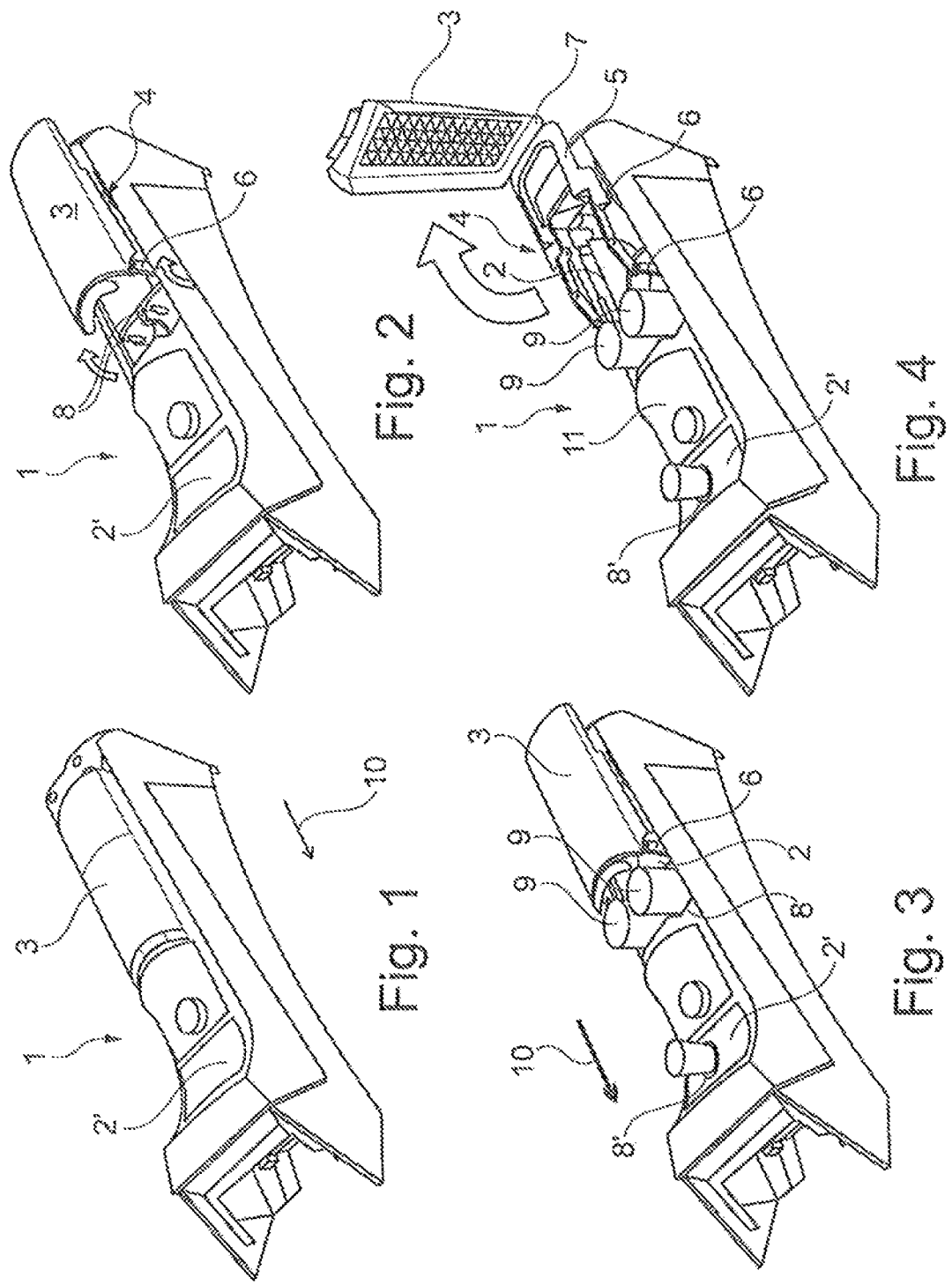

CENTRE CONSOLE

BACKGROUND AND SUMMARY OF THE INVENTION

Exemplary embodiments of the present invention relate to a centre console of a motor vehicle having a cover that is able to be opened, which covers a storage compartment located thereunder in its closed position and releases this in an open position. Exemplary embodiments of the invention also relate to a motor vehicle fitted with such a centre console.

U.S. Pat. No. 4,848,627 discloses a centre console of a motor vehicle of this type having a cover that is able to flip open backwards.

The disadvantage of the known centre consoles is that a storage compartment arranged thereunder is only easily accessible in the case of a complete opening of the cover, and the complete opening can cause difficulties for, in particular, physically disabled people. There are also covers for closing or opening a storage compartment lying thereunder that can be slid completely only in the longitudinal direction of the vehicle. These, however, in turn, are limited in their function to the pure sliding movement.

The present invention therefore is directed to an improved centre console having an increased functionality.

Exemplary embodiments of the present invention provide an entirely novel adjustment mechanism to adjust a cover closing a storage compartment in a centre console, which enables a combination of a translational sliding movement and a swivelling movement and thus enables the most varying closed states of the storage compartments arranged thereunder that would not have been able to be implemented with the hitherto purely translationally moveable or only purely swivellable covers. The adjustment mechanism according to the invention is formed in such a way that it first lifts the cover slightly during opening, and adjusts it backwards, and only subsequently swings it upwards. This offers the great advantage that the adjustment mechanism first enables a significantly translational sliding movement backwards against the direction of travel and thus releases the drinks holder already arranged in the front region of the storage compartment lying thereunder. By means of the adjustment mechanism according to the invention, an opening of the cover is thus possible via a first fundamentally pure sliding movement with a rotating movement subsequent to this. Here, the movement of the cover can, for example, be set gradually via corresponding locking elements, such that the cover according to the invention is also held securely in all intermediate positions between its closed position and its completely open position.

Expediently, the adjustment mechanism has a guiding slide, which is connected to the centre console via two parallelogram carrier pairs. The parallelogram carrier pairs enable therein a first opening step in which the cover is only slightly lifted, yet is adjusted substantially backwards translationally, as well as a second opening step which is connected to the first opening step and in which the cover then carries out a hitherto known flipping movement and thus opens the storage compartment thereunder completely. The guiding slide according to the invention with its two parallelogram carrier pairs is therein constructively comparably simple and thus also cost-efficient to produce, such that the adjustment mechanism according to the invention is provided in a simple and cost-efficient manner.

In an advantageous development of the solution according to the invention, two, in particular removable, drinks holders are provided in the storage compartment. In this case, the two drinks holders enable two drinks containers to be put down next to each other, wherein the drinks holders according to the invention are usually arranged in a front region of the storage compartment that is able to be closed by the cover. Due to a removable design of the drinks holders according to the invention, these can be removed simply when they are not needed and thus the storage space of the storage compartment can be enlarged. Using the adjustment mechanism it is possible to adjust the cover in the first opening step so far backwards that the two drinks holders are easily accessible and thus drinks can be put down in these, whereby the remaining storage compartment is still closed by the cover and thus at the same time forms an arm rest for the driver or passenger. Generally, the slideable positioning of the cover in its first opening step also enables an adaptation to different vehicle passengers, such that this can easily adjust a constantly comfortable arm rest.

Expediently, a central control unit, an ash tray, a storage compartment and/or a further drinks holder can be arranged in front of the cover in the direction of travel. Due to the cover according to the invention and the associated adjustment mechanism it is, in particular, possible to be able to arrange the central control unit further forward and thus in a position that is clearly ergonomically favourable. Additionally, the centre console according to the invention enables all elements required there in a rear region, such as, for example, rear compartment nozzles such as a rear compartment air conditioning system as well as a storage compartment or an ash tray, to be provided.

It is understood that the features that are cited above and are still to be illustrated below can not only be used in the respectively specified combination, but also in other combinations or individually, without exceeding the scope of the present invention.

BRIEF DESCRIPTION OF THE DRAWING FIGURES

Preferred exemplary embodiments of the invention are depicted in the figures and illustrated in greater detail in the description below, wherein the same reference numerals refer to the same or similar or functionally identical components.

Here, schematic views of the following are depicted:

FIG. 1 a centre console according to the invention having a storage compartment which is closed by a cover, FIG. 2 the cover in its first opening step, FIG. 3 a depiction as in FIG. 2, but with set drinks containers, FIG. 4 the cover in its second opening step, i.e. with a completely open storage compartment.

DETAILED DESCRIPTION

Corresponding to FIGS. 1 to 4, a centre console 1 of a motor vehicle that is, incidentally, not shown, has a storage compartment 2 (cf. FIGS. 2 to 4) that is able to be closed by a cover 3 arranged thereupon. According to the invention, an adjustment mechanism 4 adjusts and opening of the cover between its open position (cf. FIG. 1) and its closed position (cf. FIG. 4). The adjustment mechanism 4 is formed in such a way that this first lifts the cover 3 slightly during opening, and adjusts it backwards (cf. FIGS. 2 and 3) and subsequently swings it upwards (cf. FIG. 4). The opening movement of the cover 3 is thus divided into two opening steps, in particular a depicted first opening step according to FIGS. 2 and 3, in which the cover 3 is lifted slightly and then is only slid backwards, and a second opening step according to FIG. 4 in which the cover 3 is swung upwards.

The adjustment mechanism 4 according to the invention therein has a guiding slide 5, which is connected to the centre console 1 via two parallelogram carrier pairs 6. In the first opening step according to FIGS. 2 and 3, the guiding slide 5 is only slid slightly upwards via the two parallelogram carrier pairs 6 and otherwise exclusively backwards. The cover 3 is mounted at the rear on the guiding slide 5 via a hinge 7, as can clearly be seen from FIG. 4.

As illustrated in FIGS. 3 and 4, two drinks holders 8 are provided in the storage compartment 2, in which two drinks containers 9 (cf. FIGS. 3 and 4) can be put down next to each other. The drinks holders 8 are therein preferably formed to be able to be removed such that a storage volume of the storage compartment 2 can be clearly increased if the drinks holders 8 are removed.

A central control unit 11, an ash tray, a further storage compartment 2' and/or a further drinks container 8' can be arranged in front of the cover 3 seen in the direction of travel. Obviously, the further drinks holder 8' can therein also be formed to be removable, whereby the volumes of the further storage compartment 2' can be increased by way of a spontaneous tray. It is also conceivable that only the two drinks holders 8 arranged in the storage compartment 2 are provided, whereby the space of the further storage compartment 2' can be used for further control elements, or audio or video devices. The provision of the so-called "spontaneous tray", is also particularly advantageous in the case of a fundamentally empty storage compartment 2,2'.

Due to the adjustment mechanism 4 according to the invention, it is particularly possible to arrange the central control unit 11 further forwards so as to be more ergonomically favourable. Due to the translational slideability of the cover 3 in the first opening step, an only partial opening of the storage compartment 2 is additionally conceivable with the provision of a suitable locking, as is depicted, for example, according to FIGS. 2 and 3. It is also possible to create a comfortable arm rest for a driver or passenger of the motor vehicle using a corresponding positioning of the cover 3 in or against the direction of travel 10. It is particularly advantageous, in the adjustment mechanism 4 according to the invention to adjust the cover 3, that this covers the remaining storage compartment 2 in the first opening step (cf. FIGS. 2 and 3) and only releases the two drinks holders 8, such that the driver or passenger can easily put the respective drinks container 9 down in the associated drinks holder 8 or remove it from this and can be supported with the under arm or elbow on the cover 3.

The adjustment mechanism 4 according to the invention is additionally produced to be constructively simple and cost-efficient, such that the additional use that is achieved using the invention is able to be achieved with marginal additional costs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A center console of a motor vehicle, comprising:
    a storage compartment;
    a cover that is configured to be moveable between open and closed positions, wherein in the closed position the cover covers the storage compartment; and
    an adjustment mechanism configured to adjust and open the cover between the open and closed positions, wherein the adjustment mechanism has a guiding slide connected to the center console via two parallelogram carrier pairs, such that the adjustment mechanism first lifts the cover during opening and adjusts the cover backwards into a rear position exposing a front portion of the storage compartment and then subsequently swings the cover upwards while in the rear position.

2. The center console of claim 1, wherein a rear side of the cover is mounted on the guiding slide via a hinge.

3. The center console of claim 1, wherein the storage compartment includes two removable drink holders.

4. The center console of claim 1, further comprising:
    a central control unit, ash tray, further storage compartment, or further drink holder is arranged in front of the cover in a direction of travel.

5. A motor vehicle comprising:
    a center console, which includes
        a storage compartment;
        a cover that is configured to be moveable between open and closed positions, wherein in the closed position the cover covers the storage compartment; and
        an adjustment mechanism configured to adjust and open the cover between the open and closed positions, wherein the adjustment mechanism has a guiding slide connected to the center console via two parallelogram carrier pairs, such that the adjustment mechanism first lifts the cover during opening and adjusts the cover backwards into a rear position exposing a front portion of the storage compartment and then subsequently swings the cover upwards while in the rear position.

6. The motor vehicle of claim 5, wherein a rear side of the cover is mounted on the guiding slide via a hinge.

7. The motor vehicle of claim 5, wherein the storage compartment includes two removable drink holders.

8. The motor vehicle of claim 5, wherein the center console further comprises:
    a central control unit, ash tray, further storage compartment, or further drink holder is arranged in front of the cover in a direction of travel.

9. The center console of claim 1, wherein when the cover is swung upwards while in the rear position the entire storage compartment, including the front portion, is exposed.

10. The center console of claim 2, wherein the hinge and the guiding slide move into the rear position along with the cover.

11. The center console of claim 2, wherein the hinge is not connected to the storage compartment.

12. The motor vehicle of claim 11, wherein when the cover is swung upwards while in the rear position the entire storage compartment, including the front portion, is exposed.

13. The motor vehicle of claim 6, wherein the hinge and the guiding slide move into the rear position along with the cover.

14. The motor vehicle of claim 6, wherein the hinge is not connected to the storage compartment.

\* \* \* \* \*